2,894,994
Patented July 14, 1959

2,894,994

CONDENSATION OF AROMATIC HYDROCARBONS WITH POLYCHLOROCYCLOOLEFINS

Louis Schmerling, Riverside, Ill., assignor, by mesne assignments, to Universal Oil Products Company, Des Plaines, Ill., a corporation of Delaware No Drawing. Application August 1, 1957
Serial No. 675,553

18 Claims. (Cl. 260—650)

This application is a continuation-in-part of my co-pending application Serial No. 354,878, filed May 13, 1953, now abandoned, which is itself a continuation-in-part of my co-pending application Serial No. 234,441, filed June 29, 1951, now abandoned.

This invention relates to the interaction of polychlorocycloolefins with aromatic hydrocarbons having attached to a nuclear carbon atom a carbon atom of a saturated hydrocarbon group to which last named carbon atom is attached at least one hydrogen atom. More particularly, the process relates to the side chain alkylation of an alkylaromatic hydrocarbon with a polychlorocycloolefin in the presence of a catalyst which generates free radicals at the operating conditions.

One embodiment of this invention relates to a process which comprises forming a mixture of reactants consisting of a polychlorocycloolefin having one chlorine atom attached to each of the doubly bonded carbon atoms, an aromatic hydrocarbon having attached to a nuclear carbon atom a carbon atom of a saturated hydrocarbon group to which last named carbon atom is attached at least one hydrogen atom, and a free radical generating catalyst, and reacting the polychlorocycloolefin with the aromatic hydrocarbon by heating said mixture to a condensation temperature of from about 50° to about 300° C. and at least as high as the decomposition temperature of the catalyst, and at a pressure of from about atmospheric to about 100 atmospheres such that a substantial proportion of the reactants is in the liquid phase.

Another embodiment of this invention relates to a process which comprises forming a mixture of reactants consisting of a polychlorocycloolefin having one chlorine atom attached to each of the doubly bonded carbon atoms, an aromatic hydrocarbon having attached to a nuclear carbon atom a carbon atom of a saturated hydrocarbon group to which last named carbon atom is attached one hydrogen atom, and a peroxy compound catalyst, and reacting the polychlorocycloolefin with the aromatic hydrocarbon by heating said mixture to a condensation temperature of from about 50° to about 300° C. and at least as high as the decomposition temperature of the catalyst, and at a pressure of from about atmospheric to about 100 atmospheres such that a substantial proportion of the reactants is in the liquid phase.

A further embodiment of this invention relates to a process which comprises forming a mixture of reactants consisting of a polychlorocycloolefin having one chlorine atom attached to each of the doubly bonded carbon atoms, an aromatic hydrocarbon having attached to a nuclear carbon atom a carbon atom of a saturated hydrocarbon group to which last named carbon atom is attached at least one hydrogen atom, and an organic peroxide catalyst, and reacting the polychlorocycloolefin with the aromatic hydrocarbon by heating said mixture to a condensation temperature of from about 50° to about 300° C. and at least as high as the decomposition temperature of the catalyst, and at a pressure of from about atmospheric to about 100 atmospheres such that a substantial proportion of the reactants is in the liquid phase.

A still further embodiment of this invention relates to a process which comprises forming a mixture of reactants consisting of a polychlorocycloolefin containing at least 5 carbon atoms and not more than 6 carbon atoms in the ring and having one chlorine atom attached to each of the doubly bonded carbon atoms, an alkylaromatic hydrocarbon having at least one hydrogen atom attached to the carbon atom of the alkyl group which is attached to a nuclear carbon atom, and an organic peroxide catalyst, and reacting the polychlorocycloolefin with the alkylaromatic hydrocarbon by heating said mixture to a condensation temperature of from about 50° to about 300° C. and at least as high as the decomposition temperature of the catalyst, and at a pressure of from about atmospheric to about 100 atmospheres such that a substantial proportion of the reactants is in the liquid phase.

Aromatic hydrocarbons which are utilizable as starting materials in this process have attached to a nuclear carbon atom a carbon atom of a saturated hydrocarbon group to which last named carbon atom is attached at least one hydrogen atom. Thus the aromatic hydrocarbon has an alpha carbon atom attached to the aromatic nucleus to which alpha carbon atom is attached at least one hydrogen atom giving a structural unit which can be represented as follows:

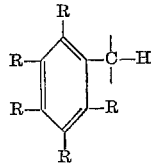

The free valences may be attached to hydrogen atoms, one of them may be attached to a hydrogen atom and the other may be attached to an alkyl group, they both may be attached to alkyl groups, one of them may be attached to a hydrogen atom and the other may be attached to or form part of a cycloalkane ring which may or may not be attached to a different nuclear carbon ring, or one may be attached to an alkyl group and the other to a cycloalkane ring, etc. Suitable aromatic hydrocarbons include toluene, ortho-xylene, meta-xylene, para-xylene, ethylbenzene, 1,2,3-trimethylbenzene, 1,2,4-trimethylbenzene, 1,3,5-trimethylbenzene, ortho-ethyltoluene, meta-ethyltoluene, para-ethyltoluene, n-propylbenzene, isopropylbenzene, para-isopropyltoluene, n-butylbenzene, sec-butylbenzene, n-amylbenzene, etc. Tertiary-butylbenzene and similar compounds in which the alpha methyl carbon atom does not have at least one hydrogen atom attached thereto are inoperative and thus are excluded from the scope of this invention. Likewise, compounds such as benzene, naphthalene, etc. are inoperative. Higher molecular weight alkylaromatic hydrocarbons, such as those produced by the alkylation of aromatic hydrocarbons as benzene or toluene with olefin polymers are also suitable, provided, of course, that the alpha methyl carbon atom contains at least one hydrogen atom. In the structural formula set forth hereinabove, the aromatic nucleus is represented as containing substituents designated by the letter R. R may be hydrogen, alkyl, aryl, cycloalkyl, alkaryl, aralkyl, etc. The defined aromatic hydrocarbons having attached to a nuclear carbon atom a carbon atom of a saturated hydrocarbon group to which last named carbon atom is attached at least one hydrogen atom also include alkylnaphthalenes, such as alpha-methylnaphthalene, beta-methylnaphthalene, ethylnaphthalene, diethylnaphthalenes, etc. Also the aromatic hydrocarbon may contain both a benzene ring and a saturated ring such as found in tetralin and indan.

The polychlorocycloolefins which may be reacted with an aromatic hydrocarbon in the presence of a free radical generating catalyst in accordance with the process of this invention comprise polychlorocycloolefins containing a pair of doubly bonded carbon atoms and one chlorine atom attached to each of the doubly bonded carbon atoms. As is readily observed, this type of configuration does not leave any free valences on the doubly bonded carbon atoms. Of the polychlorocycloolefins utilizable in the process of this invention those containing at least 5 carbon atoms but not more than 6 carbon atoms in the ring are preferred. Thus polychloro derivatives of cyclopentene, cyclopentadiene, cyclohexene, and cyclohexadiene are preferred. Examples of suitable polychlorocycloolefins include 1,2 - dichlorocyclopentene, 1,2,3 - trichloro - 1 - cyclopentene, 1,2,3,4 - tetrachloro - 1 - cyclopentene, 1,2,3,4,5 - pentachloro - 1 - cyclopentene, octachlorocyclopentene, hexachlorocyclopentadiene, 1,2 - dichloro - 3 - methyl - 1 - cyclopentene, 1,2 - dichloro - 3,4 - dimethyl - 5 - ethyl - 1 - cyclopentene, 1,2,3,4 - tetrachloro - 1,3 - cyclopentadiene, 1,2,3,4 - tetrachloro - 5,5 - dimethyl - 1,3 - cyclopentadiene, 1,2 - dichlorocyclohexene, 1,2 - dichloro - 3 - methyl - 6 - isopropylcyclohexene, 1,2,3,4-tetrachloro-1,3-cyclohexadiene, 1,2,4,5 - tetrachloro - 1,4 - cyclohexadiene, 1,2,4,5 - tetrachloro - 3,3,6,6 - tetramethyl - 1,4-cyclohexadiene, etc.. It is essential that the polychlorocycloolefin contain at least 2 chlorine atoms per molecule since monochlorocycloolefins do not give a condensation reaction of the type herein described. Also, a chlorine atom must be attached to each of the doubly bonded carbon atoms. Similarly, polyhalocycloolefins other than polychlorocycloolefins containing one chlorine atom attached to each of the doubly bonded carbon atoms do not give reactions of the type described herein. For example, 1,2-dibromocyclohexene as well as 1,2-dibromocyclopentene and hexabromocyclopentadiene are inoperative in the process of the present invention. Polychlorocycloolefins such as 1,2,3,4 - tetrachloro - 5 - trifluoromethyl-1,3-cyclopentadiene that contain one or more fluorine atoms may be used in this process since the fluorine atoms do not noticeably affect the activity of the chlorine atoms so long as the requirement is met for having one chlorine atom attached to each of the doubly bonded carbon atoms.

The catalysts that may be used in the process of the present invention are those capable of forming free radicals under the reaction conditions. These include diazonium compounds, metal alkyls, and peroxy compounds. Peroxy compounds contain the bivalent radical —O—O— which decomposes to form free radicals which initiate the general reaction of the present invention. Examples of such peroxy compounds are the persulfate, percarbonates, perborates, of the ammonium and the alkali metals; peracetic acid, persuccinic acid, dimethyl peroxide, diethyl peroxide, dipropyl peroxide, di-tert-butyl peroxide, acetyl benzoyl peroxide, propionyl peroxide, butyryl peroxide, lauryl peroxide, benzoyl peroxide, tetralin peroxide, urea peroxide, tertiary-butyl perbenzoate, tertiary-butyl hydroperoxide, methylcyclohexyl hydroperoxide, 2,4-dichlorobenzoyl peroxide, methyl ethyl ketone peroxide, cyclohexanone peroxide, cumene hydroperoxide, dicumyl peroxide, diisopropyl hydroperoxide, para-menthane hydroperoxide, isopropyl percarbonate, etc. The organic peroxy compounds constitute a preferred class of catalysts for use in this invention. Mixtures of peroxy compound catalysts may be employed or the peroxy compound catalysts may be utilized in admixture with various inert diluents as catalysts for the process of this invention. These organic peroxy compounds which are compounded commercially with various diluents for use as free radical generating catalysts may be used and include benzoyl peroxide compounded with calcium sulfate, benzoyl peroxide compounded with camphor, benzoyl peroxide compounded with hydrogenated terphenyls, benzoyl peroxide compounded with stearic acid, benzoyl peroxide compounded with tricresyl phosphate, benzoyl peroxide compounded with dibutyl terphthalate, methyl ethyl ketone peroxide compounded with dimethyl terphthalate, etc. Only catalytic amounts (less than stoichiometric amounts) need be used in the process.

The condensation of polychlorocycloolefins with alkylaromatic hydrocarbons is illustrated by the following equations showing the condensation of one molecular proportion of toluene with one molecular proportion of 1,2-dichlro-1-cyclopentene in the presence of an organic peroxide catalyst such as di-tert-butyl peroxide and the evolution of one molecular proportion of hydrogen chloride, and also the condensation of one molecular proportion of ethylbenzene with one molecular proportion of 1,2-dichloro-1-cyclohexene in the presence of an organic peroxide catalyst such as benzoyl peroxide and evolution of one molecular proportion of hydrogen chloride.

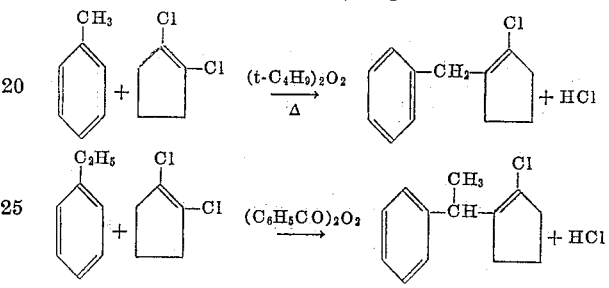

The compositions produced by the above reactions are in many instances new compositions of matter. They will undergo many of the reactions of monochlorocycloolefins and can be condensed with dienes, cycloalkadienes or hexachlorocyclopentadiene to form further new compositions of matter.

Hydrogen chloride is evolved in the condensation reactions herein disclosed in the quantity of one molecular proportion of hydrogen chloride per one molecular proportion of desired product. In cases where it is desirable to avoid radical changes in pH during the course of the reaction, small amounts of materials which have a buffering effect on the pH may be included in the reaction mixture. For example, an alkaline pH can be maintained by the use of buffers such as borax, disodium phosphate, sodium carbonate, ammonium carbonate, etc.

The process of this invention may be carried out in batch operation by placing a quantity of the aromatic hydrocarbon and the free radical generating catalyst in a reactor equipped with a mixing device, adding the polychlorocycloolefin, heating to a preselected reaction temperature while mixing the contents of the reactor, cooling after a suitable period of time, and recovering the condensation products.

The preferred method of operation is of the continuous type. In this method of operation the alkylaromatic hydrocarbon, the polychlorocycloolefin, and the catalyst are continuously charged to a reactor maintained at suitable conditions of temperature and pressure. The reactor may be an unpacked vessel or coil, or it may contain an adsorbent packing material such as fire brick, alumina, dehydrated bauxite, fuller's earth, and the like. The condensation products are separated from the reactor effluent, and the unconverted starting materials may be recycled to the reaction zone. The unreacted materials are lower boiling than the condensation products and thus are readily recoverable by conventional means such as fractionation for the purposes of recycle. In the continuous method of carrying out this process, the reactants are added continuously to the reaction zone, but if desired they may be added intermittently.

In selecting a particular reaction temperature for use in the process of the present invention, two considerations must be taken into account. First, sufficient energy by means of heat must be supplied to the reaction system so that the reactants, namely the selected aromatic hydrocarbon and polychlorocycloolefin, will be activated sufficiently for condensation to take place when free radicals are generated by the catalyst. Second, free radical generating catalysts such as peroxy compounds, particularly organic peroxides, decompose at a measurable rate with time and in logarithmic function dependent upon temperature. This rate of decomposition can be and ordinarily is expressed as the half life of the peroxide at a particular temperature. For example, the half life in hours for di-tert-butyl peroxide is 17.5 hours at 125° C., 5.3 hours at 135° C., and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitable activated state for condensation. When the half life of the free radical generating catalyst is greater than 10 hours, radicals are not generated at a sufficient rate to cause the reaction of the process of the present invention to go forward at a detectable rate. Thus the reaction temperature may be within the range of from about 50° to about 300° C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus it is within the skill of one familiar with the art to select the particular perature needed for any particular catalyst. Generally the operating temperature does not exceed the temperature at which the half life is not more than 10 hours by more than about 150° C. since free radical generating catalysts decompose radically under such conditions. However, in some instances temperatures as high as 300° C. may be utilized, for example, when the reactor is charged with the desired polychlorocycloolefin and the free radical generating catalyst in solution in the desired alkylaromatic hydrocarbon is introduced by means of pressure as a liquid under the surface of the polychlorocycloolefin maintained at the high temperature. The half life of tert-butyl perbenzoate is less than 10 hours at about 110° C. and accordingly when this peroxy compound is used as the catalyst for this process, the operating temperature is from about 110 C. to about 300° C., but generally not greater than about 265° C. An operating temperature of from about 130° C. to about 300° C. is used with di-tert-butyl peroxide and from about 75° to about 300° C., but generally not greater than about 225° C. with benzoyl peroxide. Little advantage is gained if the temperature is too high even though the reactants tend to become more activated in the presence of the free radical generating catalyst decomposing at a high rate since decomposition of the polychlorocycloolefin takes place at temperatures above about 300° C.

Although pressures of up to 100 atmospheres may be utilized, the reaction preferably takes place in liquid phase and thus will preferably range from about atmospheric to about 100 atmospheres such that a substantial proportion of the reactants is in the liquid phase. Pressure is not an important variable in the process of this invention. However, because of the low boiling points of some of the reactants it may be necessary to utilize pressure withstanding equipment to insure liquid phase conditions. In batch type operations it is often desirable to utilize pressure withstanding equipment, to charge the reactants and catalyst to the vessel, and to pressure the vessel to 10, or 30, or 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Nitrogen is also conveniently utilized when a glass liner is used along with the pressure withstanding equipment. Since the nitrogen is pressured into the vessel prior to heating, it tends to maintain the reactants within the glass liner and thus aids in their removal after the passage of the desired period of time at the reaction temperature selected.

The concentration of the catalyst employed in this process may vary over a rather wide range but for reasons of economy it is desirable to use low concentrations of the catalyst such as from about 0.1% to about 10% of the total weight of the polychlorocycloolefin and aromatic hydrocarbon charged to the process. The reaction time may be within the range of less than one minute to several hours, depending upon temperature and half life of the free radical generating catalyst, as set forth hereinabove. Generally, contact times of at least 10 minutes are preferred.

The arylchlorocycloolefins formed in the process of this invention are in many instances new compositions of matter. As such they may be used for the preparation of polymers, resins, pharmaceuticals, and in the synthesis of diverse organic chemicals. Some of them are useful per se as pesticides. They also may be reacted with cyclopentadiene or hexachlorocyclopentadiene in the familiar Diels-Alder reaction to form chlorinated polycyclic compounds containing an aromatic substituent and which have insecticidal properties. The arylchlorocycloolefins formed by the process of this invention may be sulfated or the aromatic nucleus may be sulfonated to form materials which are surface active agents such as wetting agents or detergents.

The following example is introduced to illustrate the generally broad scope of the invention but with no intention of unduly limiting the same.

*Example 1*

Toluene was reacted with hexachlorocyclopentadiene in a glass flask in the presence of benzoyl peroxide as the free radical generating catalyst. In this experiment 100 grams of toluene, 40 grams of hexachlorocyclopentadiene, and 4 grams of benzoyl peroxide were added to the flask, heating was initiated, and sufficient heat supplied so that the toluene began to reflux. This toluene reflux meant that the temperature of the reactants reached 110° C., and this temperature was maintained for one hour. The flask was open to the atmosphere so that the pressure at which the reaction was carried out was atmospheric. The reaction mixture was then cooled, 3 more grams of benzoyl peroxide were added, and the mixture was again refluxed for 16 hours at about 110° C. at atmospheric pressure. At this temperature of 110° C., the half life of the benzoyl peroxide is not more than 10 hours. The reason for the 16 hour period was that the reflux was maintained overnight. At the end of this time the reaction mixture was cooled and washed with water to remove benzoic acid formed from the benzoyl peroxide. The hydrocarbon layer was then distilled. From the distillation 87 grams of toluene and 23.4 grams of hexachlorocyclopentadiene were recovered unreacted and suitable for recycle. The desired product in the quantity of 15 grams was obtained as a fraction boiling at 156–158° C./6 mm. This represents a 75% yield based upon the hexachlorocyclopentadiene which reacted. Carbon, hydrogen, and chlorine analyses were carried out on this fraction and the results are as follows: Calculated for $C_6H_5CH_2C_5Cl_5$: C, 43.88%; H, 2.15%; and Cl, 53.97%. Found: C, 44.34%; H, 2.33%;

and Cl, 53.40%. This product is felt to be principally of the following structure:

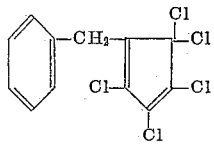

1-benzyl-2,3,4,5,5-pentachlorocyclopentadiene.

The mechanism of the peroxide induced reaction of toluene with hexachlorocyclopentadiene may be written as follows:

(1) Decomposition of benzoyl peroxide to benzoyl free radicals:

$$(C_6H_5CO)_2O_2 \rightarrow 2C_6H_5COO—$$

(2) Reaction of the benzoyl radicals with toluene:

$$C_6H_5COO— + C_6H_5CH_3 \rightarrow C_6H_5CH_2— + C_6H_5COOH$$

(3) Addition of benzyl radical to hexachlorocyclopentadiene:

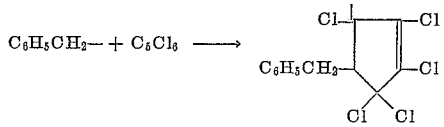

(4) Elimination of a chlorine atom:

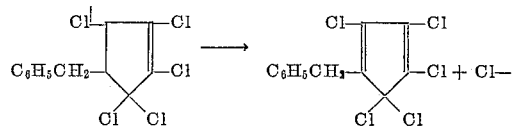

(5) Reaction of chlorine atom with toluene:

$$C_6H_5CH_3 + Cl— \rightarrow C_6H_5CH_2— + HCl$$

The benzyl radical formed in step 5 reacts with hexachlorocyclopentadiene and a new cycle is started. The reactions of steps 1 and 2 serve only as chain starters. The benzyl radicals formed in step 5 may also react with one another to form dibenzyl as the chain terminating step:

$$2C_6H_5CH_2— \rightarrow C_6H_5CH_2CH_2C_6H_5$$

The fraction, described hereinabove, boiling at 156–158° C./6 mm., on standing became partly crystalline and after filtration and recrystallization, the crystals had a melting point of 58–60° C.

Example II

In this example toluene is reacted with 1,2-dichloro-1-cyclopentene in a glass lined rotating autoclave of 850 cc. capacity in the presence of di-tert-butyl peroxide as the free radical generating catalyst. The quantities of reactants utilized are 92 grams of toluene, 70 grams of 1,2-dichloro-1-cyclopentene, and 8 grams of di-tert-butyl peroxide. The experiment is carried out at a temperature of 130–140° C. since it has been found that the reactants are satisfactorily activated at this temperature and that the half life of this peroxide is not greater than 10 hours at this temperature. This, of course, does not mean that a higher temperature could not be utilized with suitable modification in the equipment. After charging the reactants and catalyst to the autoclave in the glass liner the autoclave is sealed and 30 atmospheres of nitrogen is then pressured into the autoclave. The purpose of this nitrogen pressure is simply to insure that the reactants and catalyst remain in contact with one another in the glass liner. Upon heating the autoclave to the selected temperature, the pressure in the autoclave increases 20–30 atmospheres due to expansion of the nitrogen and vaporization of a portion of the reactants. This means that the total pressure at the reaction temperature is in the neighborhood of 50–60 atmospheres, most of this pressure being due to the nitrogen. The autoclave is heated for 4 hours at 130–140° C. after which time it is cooled to room temperature, the glass liner is removed, and the products are separated by fractional distillation to recover unconverted starting material from the condensation products. From this experiment a high yield of 1-benzyl-2-chloro-1-cyclopentene is obtained of the following structure:

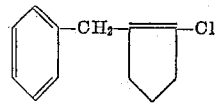

Example III

This example illustrates the reaction of ethylbenzene with 1,2-dichloro-1-cyclohexene. In this experiment the quantities of the reactants utilized are 106 grams of ethylbenzene, 75 grams of 1,2-dichloro-1-cyclohexene, and 6 grams of tertiary butyl perbenzoate. This reaction may be carried out at atmospheric pressure since the boiling points of the reactants are sufficiently high. The temperature which would be reached at reflux is above about 136° C. However, the reactants are sufficiently activated at 110° C. which is a sufficient temperature so that the half life of the tertiary butyl perbenzoate is not more than 10 hours. Because of these factors this reaction is suitably carried out in a glass flask at atmospheric pressure at 110° C. After 12 hours at this temperature, a high yield of 1-(α-methylbenzyl)-2-chlorocyclohexene is isolated having the following structure:

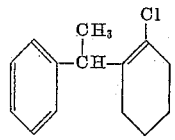

I claim as my invention:

1. A process which comprises forming a mixture of reactants consisting of a polychlorocycloolefin having one chlorine atom attached to each of the doubly bonded carbon atoms and whose cycloolefin component is selected from the group consisting of cyclopentene, cyclopentadiene, cyclohexene and cyclohexadiene, an aromatic hydrocarbon having attached to a nuclear carbon atom a carbon atom of a saturated hydrocarbon group to which last named carbon atom is attached at least one hydrogen atom, and a free radical generating catalyst, said hydrocarbon being selected from the group consisting of benzene and naphthalene derivatives having only saturated hydrocarbon substitution, and reacting the polychlorocycloolefin with the aromatic hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

2. A process which comprises forming a mixture of reactants consisting of a polychlorocycloolefin having one chlorine atom attached to each of the doubly bonded carbon atoms and whose cycloolefin component is selected from the group consisting of cyclopentene, cyclopentadiene, cyclohexene and cyclohexadiene, an aromatic hydrocarbon having attached to a nuclear carbon atom a carbon atom of a saturated hydrocarbon group to which last named carbon atom is attached at least one hydrogen atom, and a peroxy compound catalyst, said hydrocarbon being selected from the group consisting of benzene and naphthalene derivatives having only saturated hydrocarbon substitution, and reacting the polychlorocycloolefin with the aromatic hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

3. A process which comprises forming a mixture of reactants consisting of a polychlorocycloolefin having one chlorine atom attached to each of the doubly bonded carbon atoms and whose cycloolefin component is selected from the group consisting of cyclopentene, cyclopentadiene, cyclohexene and cyclohexadiene, an aromatic hydrocarbon having attached to a nuclear carbon atom a carbon atom of a saturated hydrocarbon group to which last named carbon atom is attached at least one hydrogen atom, and an organic peroxide catalyst, said hydrocarbon being selected from the group consisting of benzene and naphthalene derivatives having only saturated hydrocarbon substitution, and reacting the polychlorocycloolefin with the aromatic hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

4. A process which comprises forming a mixture of reactants consisting of a polychlorocycloolefin having one chlorine atom attached to each of the doubly bonded carbon atoms and whose cycloolefin component is selected from the group consisting of cyclopentene, cyclopentadiene, cyclohexene and cyclohexadiene, an aromatic hydrocarbon having attached to a nuclear carbon atom a carbon atom of a saturated hydrocarbon group to which last named carbon atom is attached at least one hydrogen atom, and a benzoyl peroxide catalyst, said hydrocarbon being selected from the group consisting of benzene and naphthalene derivatives having only saturated hydrocarbon substitution, and reacting the polychlorocycloolefin with the aromatic hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

5. A process which comprises forming a mixture of reactants consisting of a polychlorocycloolefin having one chlorine atom attached to each of the doubly bonded carbon atoms and whose cycloolefin component is selected from the group consisting of cyclopentene, cyclopentadiene, cyclohexene and cyclohexadiene, a benzene hydrocarbon having attached to a nuclear carbon atom a carbon atom of a saturated hydrocarbon group to which last named carbon atom is attached at least one hydrogen atom, and a free radical generating catalyst, said benzene hydrocarbon having only saturated hydrocarbon substitution, and reacting the polychlorocycloolefin with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

6. A process which comprises forming a mixture of reactants consisting of a polychlorocycloolefin having one chlorine atom attached to each of the doubly bonded carbon atoms and whose cycloolefin component is selected from the group consisting of cyclopentene, cyclopentadiene, cyclohexene and cyclohexadiene, a benzene hydrocarbon having attached to a nuclear carbon atom a carbon atom of a saturated hydrocarbon group to which last named carbon atom is attached at least one hydrogen atom, and a peroxy compound catalyst, said benzene hydrocarbon having only saturated hydrocarbon substitution, and reacting the polychlorocycloolefin with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

7. A process which comprises forming a mixture of reactants consisting of a polychlorocycloolefin having one chlorine atom attached to each of the doubly bonded carbon atoms and whose cycloolefin component is selected from the group consisting of cyclopentene, cyclopentadiene, cyclohexene and cyclohexadiene, a benzene hydrocarbon having attached to a nuclear carbon atom a carbon atom of a saturated hydrocarbon group to which last named carbon atom is attached at least one hydrogen atom, and an organic peroxide catalyst, said benzene hydrocarbon having only saturated hydrocarbon substitution, and reacting the polychlorocycloolefin with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

8. A process which comprises forming a mixture of reactants consisting of a polychlorocycloolefin having one chlorine atom attached to each of the doubly bonded carbon atoms and whose cycloolefin component is selected from the group consisting of cyclopentene, cyclopentadiene, cyclohexene and cyclohexadiene, an alkyl benzene hydrocarbon having only alkyl substitution and having at least one hydrogen atom attached to the carbon atom of the alkyl group which is attached to a nuclear carbon atom, and a free radical generating catalyst, and reacting the polychlorocycloolefin with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

9. A process which comprises forming a mixture of reactants consisting of a polychlorocycloolefin having one chlorine atom attached to each of the doubly bonded carbon atoms and whose cycloolefin component is selected from the group consisting of cyclopentene, cyclopentadiene, cyclohexene and cyclohexadiene, an alkyl benzene hydrocarbon having only alkyl substitution and having at least one hydrogen atom attached to the carbon atom of the alkyl group which is attached to a nuclear carbon atom, and a peroxy compound catalyst, and reacting the polychlorocycloolefin with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

10. A process which comprises forming a mixture of reactants consisting of a polychlorocycloolefin having one chlorine atom attached to each of the doubly bonded carbon atoms and whose cycloolefin component is selected from the group consisting of cyclopentene, cyclopentadiene, cyclohexene and cyclohexadiene, an alkyl benzene hydrocarbon having only alkyl substitution and having at least one hydrogen atom attached to the carbon atom of the alkyl group which is attached to a nuclear carbon atom, and an organic peroxide catalyst, and reacting the polychlorocycloolefin with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

11. A process which comprises forming a mixture of reactants consisting of hexachlorocyclopentadiene, an alkyl benzene hydrocarbon having only alkyl substitution and having at least one hydrogen atom attached to the carbon atom of the alkyl group which is attached to a nuclear carbon atom, and a free radical generating catalyst, and reacting the hexachlorocyclopentadiene with said hydrocarbon by heating said mixture to a condensation temperature of from 75° to about 300° C. and at least as high as the decomposition temperature of the catalyst, and at a pressure of from about atmospheric to about 100 atmospheres such that a substantial proportion of the reactants is in the liquid phase.

12. A process which comprises forming a mixture of reactants consisting of hexachlorocyclopentadiene, an alkyl benzene hydrocarbon having only alkyl substitution and having at least one hydrogen atom attached to the carbon atom of the alkyl group which is attached to a nuclear carbon atoms, and peroxy compound catalyst, and reacting the hexachlorocyclopentadiene with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

13. A process which comprises forming a mixture of reactants consisting of hexachlorocyclopentadiene, an alkyl benzene hydrocarbon having only alkyl substitution and having at least one hydrogen atom attached to the carbon atom of the alkyl group which is attached to a nuclear carbon atom, and an organic peroxide catalyst, and reacting the hexachlorocyclopentadiene with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

14. A process which comprises forming a mixture of reactants consisting of hexachlorocyclopentadiene, an alkyl benzene hydrocarbon having only alkyl substitution and having at least one hydrogen atom attached to the carbon atom of the alkyl group which is attached to a nuclear carbon atom, and a benzoyl peroxide catalyst, and reacting the hexachlorocyclopentadiene with said hydrocarbon by heating said mixture to a condensation temperature of from about 75° to about 300° C., and at a pressure of from about atmospheric to about 100 atmospheres such that a substantial proportion of the reactants is in the liquid phase.

15. A process which comprises forming a mixture of reactants consisting of hexachlorocyclopentadiene, toluene, and a benzoyl peroxide catalyst, and reacting the hexachlorocyclopentadiene with the toluene by heating said mixture to a condensation temperature of from about 75° C. to about 300° C., and at a pressure of from about atmospheric to about 100 atmospheres such that a substantial proportion of the reactants is in the liquid phase.

16. A process which comprises forming a mixture of reactants consisting of hexachlorocyclopentadiene, toluene, and di-tert-butyl peroxide catalyst, and reacting the hexachlorocyclopentadiene with the toluene by heating said mixture to a condensation temperature of from about 130° to about 300° C., and at a pressure of from about atmospheric to about 100 atmospheres such that a substantial proportion of the reactants is in the liquid phase.

17. A process which comprises forming a mixture of reactants consisting of 1,2-dichloro-1-cyclopentene, toluene, di-tert-butyl peroxide catalyst, and reacting the 1,2-dichloro-1-cyclopentene with the toluene by heating said mixture at a condensation temperature of from about 130° to about 300° C., and at a pressure of from about atmospheric to about 100 atmospheres such that a substantial proportion of the reactants is in the liquid phase.

18. A process which comprises forming a mixture of reactants consisting of 1,2-dichloro-1-cyclohexene, ethylbenzene, and tertiary butyl perbenzoate catalyst, and reacting the 1,2-dichloro-1-cyclohexene with the ethylbenzene by heating said mixture to a condensation temperature of from about 110° to about 300° C., and at a pressure of from about atmospheric to about 100 atmospheres such that a substantial proportion of the reactants is in the liquid phase.

References Cited in the file of this patent

UNITED STATES PATENTS

| | | |
|---|---|---|
| 2,384,400 | Rummelsburg | Sept. 5, 1945 |
| 2,404,402 | Arnold | Oct. 1, 1946 |
| 2,606,910 | Herzfeld et al. | Aug. 12, 1952 |
| 2,658,926 | Hyman et al. | Nov. 10, 1953 |